Dec. 30, 1969  TOMOAKI YOSHIOKA ET AL  3,486,396
STEERING APPARATUS FOR MOTOR CAR
Filed Jan. 18, 1968
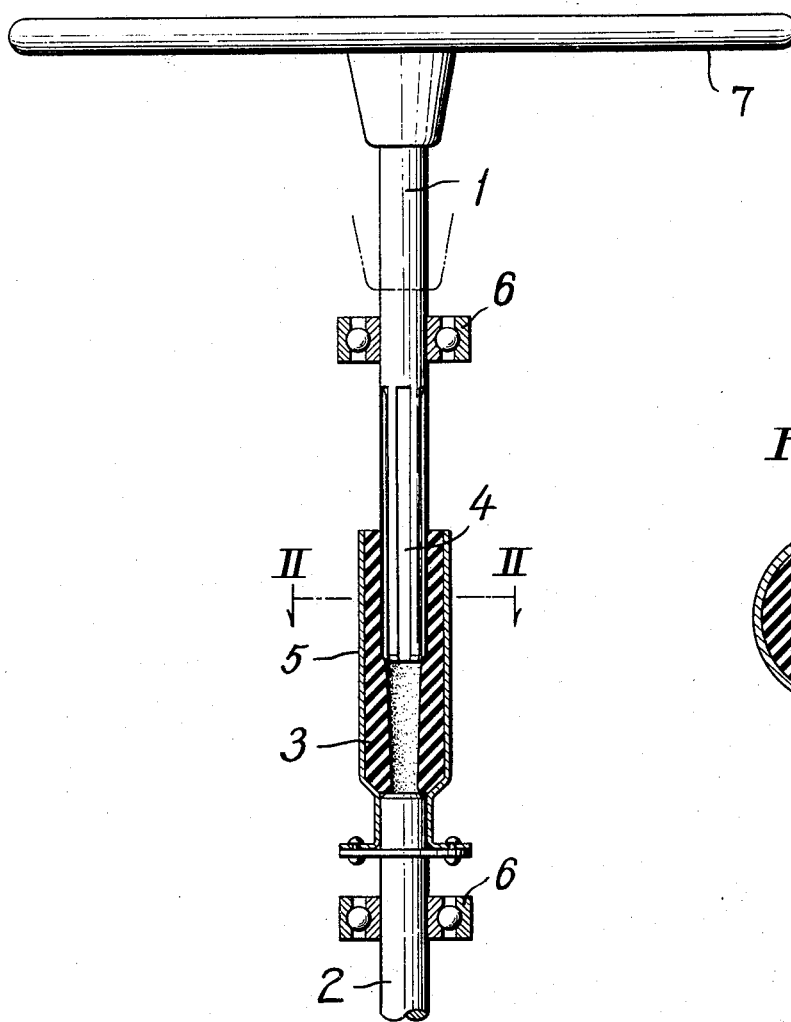
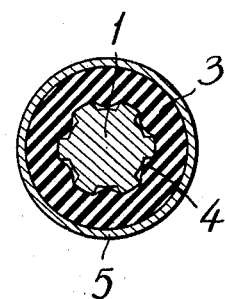
INVENTOR.
*Tomoaki Yoshioka*
*Kiyoshi Fukuchi*

United States Patent Office 3,486,396
Patented Dec. 30, 1969

3,486,396
STEERING APPARATUS FOR MOTOR CAR
Tomoaki Yoshioka, Saitama-ken, and Kiyoshi Fukuchi, Tokyo, Japan, assignors to Kabushiki Kaisha Honda Gijutsu Kenkyusho, Yamato-machi, Kittadachi-gun, Saitama-ken, Japan
Filed Jan. 18, 1968, Ser. No. 698,886
Claims priority, application Japan, Jan. 20, 1967, 42/5,486
Int. Cl. B62d 1/18
U.S. Cl. 74—492   9 Claims

ABSTRACT OF THE DISCLOSURE

Steering apparatus in which a first shaft portion, connected to a steering wheel, is inserted into an elastic tube connected to a second shaft portion such that normally the friction between the tube and the first shaft enables the shafts to undergo common rotation and be relatively axially fixed, whereas when an impact force is applied to the steering wheel, the first shaft can penetrate more deeply into the tube, against the action of the frictional engagement therein, so as to absorb and lessen the shock force on the body striking the steering wheel.

BRIEF SUMMARY OF THE INVENTION

The present invention relates to a steering apparatus for a motor car.

An object of the invention is to provide a steering apparatus which incorporates a shock absorbing coupling which is intended to minimize physical injury to the driver at the time of an accident, due to the driver striking his chest against the steering wheel.

The present invention is characterized by the provision of an elastic frictional coupling between two axial shaft portions of a steering column by which the shaft portions are normally secured for common rotation and held in fixed axial position whereas when a force exceeding a predetermined value is applied to one of the shaft portions, the frictional coupling yields and the portions are relatively moved.

The elastic coupling is constituted as an elastic tube which is secured to one of the shaft portions, the other shaft portion being inserted and frictionally engaged in the tube. The tube may have a bore which narrows in the direction of insertion of said other shaft portion, or the latter shaft portion may have an increasing size in said direction so that increased insertion causes tighter engagement in addition to increased area of contact.

In order to provide tight engagement between the tube and the inserted shaft portion, they may have dissimilar surface configurations. Thus, the outer surface of the shaft portion may have splined portions, while the bore of the tube is smooth.

BRIEF DESCRIPTION OF THE DRAWING

FIG. 1 is a side view, partly in section, of an embodiment of the present invention, and FIG. 2 is a sectional view taken along line II—II in FIG. 1.

DETAILED DESCRIPTION

In the drawing, there is shown a steering apparatus which includes a steering shaft having an operating portion 1 connected to a steering wheel 7 and a driven portion 2 which acts on a steering gear mechanism (not shown) to turn the steerable wheels of the vehicle.

An elastic tube portion 3 is attached to portion 2 and the operating portion 1 is inserted partway into tube portion 3. The operating portion 1 is forceably held by friction in the tube portion 3 so that under conditions of normal operation, the portions 1 and 3 are coupled together in rotation while the portion 1 cannot be further inserted into tube portion 3.

In order to insure rotational coupling of the shaft portions 1 and 2, the end of the portion 1 which is inserted in the elastic tube portion 3 has an outer diameter larger than the inner diameter of the elastic tube portion 3 and, also, the cross sections are of different shape, thus, as illustrated in FIG. 2, the tube portion 3 has a circular opening and the shaft 1 is provided with axial splines 4 thereon.

The elastic tube portion 3 is provided at the periphery thereof with a rigid tube 5 mounted thereon so as to prevent buckling deformation of the tube portion 3 and also radial enlargement thereof.

Bearings 6 support portions 1 and 2 respectively.

The device of the present invention, as constructed as above, operates such that during normal driving any turning of the steering wheel 7 is transmitted from the operating portion 1 to the driven portion 2 via the engagement between the shaft portion 1 and the elastic tube portion 3. If a moderate axial force is applied to the shaft, the shaft portion 1 will not enter further into tube portion 3 because the friction between the shaft 1 and the elastic tube 3 is large. Thus, the overall length of the steering column remains unchanged. If however, the vehicle is involved in a collision and the driver strikes the steering wheel 7 with great impact, the shaft portion 1 will be pushed further into tube portion 3 against the action of the friction between shaft portion 1 and the elastic tube portion 3. As the portion 1 further enters the tube portion 3, the area of contact between the shaft portion 1 and the elastic tube portion 3 increases whereby the friction between portions 1 and 3 increases. In the course of the above, the shock is absorbed and the reaction force on the driver is reduced. Thus severe injury caused by the strong impact of the driver with the steering wheel is avoided.

As seen, the shock absorbing apparatus is simple and is obtained by attachment of the elastic tube portion 3 to one of the shaft portions, the other shaft portion being pushed into the tube portion 3. The restriction of the relative axial sliding movement, under normal operating conditions, between the elastic tube portion 3 and the shaft portion 1, pushed therein, is simply obtained by properly selecting the extent of the frictional contact area between the portions 1 and 3. The elastic tube portion 3 also serves to absorb vibration from the vehicle wheels, thereby aiding in the handling of the vehicle.

In order to insure the absorption of the shock at the time of collision, it is preferable that the inner diameter of the elastic tube portion 3 be tapered in a direction away from shaft portion 1 as illustrated. Alternatively, the inner diameter of the elastic tube portion 3 may be constant throughout its entire length, while the shaft portion 1 gradually increases in diameter rearward towards the steering wheel.

What is claimed is:

1. Steering apparatus for a motor car comprising first and second shaft portions, and means elastically coupling said portions and providing a frictional connection in which said portions undergo common rotation and are held in fixed axial position until a force exceeding a predetermined value is applied to one of said shaft portions at which time the frictional connection yields and the portions are relatively moved, said elastic coupling means comprising an elastic tube secured to the first said shaft portion, the second shaft portion being tightly inserted into the tube with frictional engagement.

2. Steering apparatus as claimed in claim 1 wherein said second shaft portion has an external surface configuration which is dissimilar from the elastic tube in the interior thereof.

3. Steering apparatus as claimed in claim 2 wherein said second shaft portion has an outer surface with splines thereon.

4. Steering apparatus as claimed in claim 2 wherein said elastic tube has a bore which narrows in the direction in which said second shaft portion is inserted thereinto.

5. Steering apparatus as claimed in claim 1 comprising a rigid tube encircling the elastic tube to prevent buckling thereof.

6. Steering apparatus as claimed in claim 1 comprising a steering wheel secured to said second shaft portion.

7. Steering apparatus as claimed in claim 1 wherein said second shaft portion has an external surface and the tube an inner surface, one of which surfaces varies in size in the direction of insertion such that upon increased insertion of the second shaft portion into the tube, the second shaft portion is more tightly engaged in the tube.

8. Steering apparatus as claimed in claim 1 wherein said shaft portions are in axial alignment, the second shaft portion being driven more deeply into the elastic tube, against the action of the frictional engagement thereof with the elastic tube, when a force is applied to the second shaft which is greater than said predetermined value whereby shock force is absorbed and lessened while the frictional contact area of the second shaft with the elastic tube is increased.

9. Steering apparatus as claimed in claim 1 wherein said second shaft portion has an external diameter greater than the internal diameter of the tube.

References Cited

UNITED STATES PATENTS 2,199,926  5/1940  Swennes _____ 64—23
3,046,759  7/1962  Deford et al.

MILTON KAUFMAN, Primary Examiner

U.S. Cl. X.R.

188—67